United States Patent
Suzuki et al.

(10) Patent No.: US 8,534,926 B2
(45) Date of Patent: Sep. 17, 2013

(54) CLUTCH RELEASE BEARING

(75) Inventors: Akiyuki Suzuki, Nagoya (JP); Takashi Sugimoto, Nagoya (JP); Motoshi Kawamura, Kitakatsuragi-gun (JP); Kouhei Yamaguchi, Chiryu (JP); Tetsuro Inoue, Kashiwara (JP); Yoshitaka Nakagawa, Kashiwara (JP)

(73) Assignee: Jtekt Corporation, Osaka-shi (JP)

( * ) Notice: Subject to any disclaimer, the term of this patent is extended or adjusted under 35 U.S.C. 154(b) by 346 days.

(21) Appl. No.: 12/995,013

(22) PCT Filed: May 27, 2009

(86) PCT No.: PCT/JP2009/059667
§ 371 (c)(1),
(2), (4) Date: Nov. 29, 2010

(87) PCT Pub. No.: WO2009/145216
PCT Pub. Date: Dec. 3, 2009

(65) Prior Publication Data
US 2011/0129175 A1    Jun. 2, 2011

(30) Foreign Application Priority Data

May 27, 2008  (JP) ................ 2008-137938
May 27, 2008  (JP) ................ 2008-137939

(51) Int. Cl.
| F16C 33/76 | (2006.01) |
| F16C 33/80 | (2006.01) |
| F16D 19/00 | (2006.01) |
| F16D 23/14 | (2006.01) |

(52) U.S. Cl.
USPC ........... 384/607; 384/477; 384/484; 384/609; 192/98

(58) Field of Classification Search
USPC ................ 384/477, 480, 482, 485, 586, 589, 384/607, 609, 484; 192/98, 89.213, 110 B
See application file for complete search history.

(56) References Cited

U.S. PATENT DOCUMENTS 3,741,361 A * 6/1973 Brandenstein ................ 384/537
3,921,775 A * 11/1975 Matyschik ........................ 192/98

(Continued)

FOREIGN PATENT DOCUMENTS

FR    2661470 A1 * 10/1991
JP    59-30933 U    2/1984

(Continued)

OTHER PUBLICATIONS

Office Action issued Nov. 20, 2012 in Japanese Application No. 2008-137939 (With English Translation).

(Continued)

*Primary Examiner* — Marcus Charles
(74) *Attorney, Agent, or Firm* — Oblon, Spivak, McClelland, Maier & Neustadt, L.L.P.

(57) ABSTRACT

There is provided a clutch release bearing in which a water resistance is enhanced. At a side axially opposite from one side where an outer ring rib of a clutch release bearing is formed, there is provided a first seal member externally fitted to an outer ring to be fixed thereto. A seal lip disposed in sliding contact with an outside-diameter surface of an inner ring is formed at a radially-inward distal end of the first seal member. An annular guide is provided at a bearing-outward side of the first seal member, and an axial lip which extends toward the outside of the bearing and extends to be disposed radially outwardly of the guide is formed at a bearing-outward side face of the first seal member. The axial lip is disposed in non-contact, close relation to the guide to form a labyrinth. A radially outwardly-open groove is formed in a joint portion of the axial lip joined to the first seal member.

9 Claims, 6 Drawing Sheets

(56) References Cited

U.S. PATENT DOCUMENTS

| | | | | |
|---|---|---|---|---|
| 4,815,867 A | * | 3/1989 | Ladin | 384/617 |
| 5,113,988 A | * | 5/1992 | Caron | 192/98 |
| 5,150,778 A | * | 9/1992 | Wolbers et al. | 192/98 |
| 5,547,058 A | * | 8/1996 | Parzefall et al. | 192/85.49 |
| 5,887,984 A | * | 3/1999 | Duval | 384/477 |
| 5,992,598 A | * | 11/1999 | Ponson et al. | 192/89.23 |
| 6,056,446 A | * | 5/2000 | Welter et al. | 384/607 |
| 6,189,670 B1 | * | 2/2001 | Ponson et al. | 192/98 |
| 6,684,997 B2 | * | 2/2004 | Klopfer et al. | 192/98 |
| 6,702,085 B1 | * | 3/2004 | Ponson | 192/98 |
| 6,843,354 B2 | * | 1/2005 | Dittmer et al. | 192/98 |
| 2001/0004038 A1 | * | 6/2001 | Winkelmann et al. | 92/107 |
| 2002/0134640 A1 | * | 9/2002 | Klopfer et al. | 384/495 |

FOREIGN PATENT DOCUMENTS

| | | | |
|---|---|---|---|
| JP | 63289331 A | * | 11/1988 |
| JP | 4-4325 | | 1/1992 |
| JP | 2001 311437 | | 11/2001 |
| JP | 2003 314573 | | 11/2003 |
| JP | 2004 176782 | | 6/2004 |
| JP | 2006 9826 | | 1/2006 |
| JP | 2006-37978 | | 2/2006 |
| JP | 2006 189086 | | 7/2006 |
| JP | 2006189086 A | * | 7/2006 |
| JP | 2006 207619 | | 8/2006 |
| JP | 2008232405 A | * | 10/2008 |
| WO | WO 2006/008898 A1 | | 1/2006 |

OTHER PUBLICATIONS

Office Action issued Nov. 20, 2012 in Japanese Application No. 2008-137938 (With English Translation).

International Search Report issued Sep. 8, 2009 in PCT/JP09/059667 filed May 27, 2009.

* cited by examiner

CLUTCH RELEASE BEARING

CROSS REFERENCE TO RELATED APPLICATIONS

This application is a National Stage application under 35 U.S.C. §371 of PCT/JP09/59667, filed May 27, 2009, claims the benefit of domestic priority to PCT/JP09/59667, and claims the benefit of foreign priority under 35 U.S.C. §119 from JP 2008-137938 and from JP 2008-137939, both filed May 27, 2008.

TECHNICAL FIELD

This invention relates to a clutch release bearing. Specifically, the invention relates to a sealing structure of a clutch release bearing of the type in which an outer ring rotates in contact with a rotating member of a clutch mechanism.

BACKGROUND ART

A clutch release bearing is incorporated in a clutch device mounted between an engine and a transmission of an automobile. With respect to this clutch release bearing, there are the outer ring-rotating/inner ring-fixed type in which an outer ring rotates in contact with a rotating member of a clutch mechanism such as a diaphragm spring and the outer ring-fixed/inner ring-rotating type in which an inner ring rotates in contact with a rotating member of a clutch mechanism.

When water intrudes into the interior of this clutch release bearing, lubricating oil such as grease sealed in the interior of the bearing is deteriorated, and rust develops within the bearing, thus inviting a shortened life of the bearing.

Therefore, among clutch release bearings, there is the type employing a sealing structure constructed such that in order to prevent foreign matters such as water from intruding from the exterior of the bearing into the interior of the bearing and also to prevent lubricating oil such as grease sealed in the interior of the bearing from flowing to the exterior of the bearing, a seal fixed to one of an inner ring and an outer ring and held in contact or out of contact with the other is disposed between the inner ring and the outer ring at both ends in an axial direction.

Sealing structures of an outer ring-rotating/inner ring-fixed clutch release bearing are described in JP-A-2006-189086 Publication (Patent Literature 1) and JP-A-2001-311437 Publication (Patent Literature 2) serving as prior art literature. In the clutch release bearing described in Patent Literature 1, a seal member fixed to an inner ring and disposed in sliding contact with an outer ring is provided at the front side where a rotating member of a clutch mechanism is provided. And, a seal member fixed to the outer ring and disposed in sliding contact with the inner ring is provided at the opposite side, that is, the rear side in the axial direction. Also, with respect to an outer ring-rotating/inner ring-fixed clutch release bearing, a sealing structure constructed such that a seal member fixed to an outer ring is disposed in sliding contact with an inner ring is described in JP-A-2006-9826 Publication (Patent Literature 3).

A fragmentary cross-sectional view of a clutch release bearing 210 generally identical in construction to the clutch release bearing described in Patent Literature 1 is shown in FIG. 9.

The clutch release bearing 210 is the type of clutch release bearing comprising an outer ring 220 at which a radially inwardly-extending rib 222 having a convexly arc-shaped surface is formed, an inner ring 230 at which a radially inwardly-extending flat rib 232 is formed, and a plurality of rolling elements 214 rollably received between the inner ring 230 and the outer ring 220, and the outer ring 220 rotates by contact of a rotating member 212 of a clutch mechanism and the rib 222 of the outer ring 220 with each other.

And, the construction is such that at the front side where the rib 222 of the outer ring 220 is formed, a seal 250 is provided in abutting relation to a side face of the rib 232 of the inner ring 230, and a side lip 252 integrally joined to the seal 250 is disposed in sliding contact with the rib 222 of the outer ring 220. And, the construction is such that at the rear side opposite in an axial direction from that side where the rib 222 of the outer ring 220 is formed, a seal 240 is provided in internally-fitted relation to an inner peripheral surface of the outer ring 220, and a seal lip 242 formed at a distal end of the seal 240 is disposed in sliding contact with an outside-diameter surface of the inner ring 230. Therefore, the clutch release bearing 210 has such a structure that lubricating oil is less liable to leak and that muddy water is less liable to intrude, and therefore it is thought that the good lubricating ability and water resistance can be maintained.

PRIOR ART LITERATURE

Patent Literature

Patent Literature 1: JP-A-2006-189086 Publication
Patent Literature 2: JP-A-2001-311437 Publication
Patent Literature 3: JP-A-2006-9826 Publication

SUMMARY OF THE INVENTION

Problem that the Invention is to Solve

However, clutch release bearings are required to have a low-torque design. In addition, in the contact-type sealing structure, the generation of heat by friction becomes the cause of deterioration of lubricating oil such as grease. Therefore, with respect to the front-side seal, the seal is disposed in non-contact, close relation to the outer ring to form a labyrinth, or is disposed in light contact therewith, thereby achieving a low-torque design.

On the other hand, with respect to the rear side, when the seal lip is disposed in light contact with the outside-diameter surface of the inner ring in order to achieve a low-torque design, interference of the seal lip is sometimes lost by the influence of a centrifugal force in a high-speed rotational range since the seal rotates together with the outer ring.

On a rainy day and at a bad road having puddles, a large amount of muddy water splashes on a clutch housing, and when the muddy water enters the interior of the clutch housing, the muddy water is picked up by a flywheel, and reaches the rear side of the clutch release bearing. And, when the muddy water intrudes into a clearance between the outer ring and the inner ring at the rear side of the clutch release bearing, the muddy water intrudes into the interior of the bearing through the clearance between the inner ring and the seal lip to deteriorate the lubricating oil such as grease to thereby shorten the life of the bearing if the interference of the seal lip does not exist or the interference is small.

On the other hand, a fragmentary cross-sectional view of a clutch release bearing 210 generally identical in construction to the clutch release bearing described in Patent Literature 2 is shown in FIG. 10. As shown in FIG. 10, in this clutch release bearing 210, an elastic sleeve 260 for self-aligning purposes is fixed to an inner periphery of an inner ring 230, a plurality of balls (rolling elements) 214 being rollably disposed between this inner ring and an outer ring 220. At one end portion of the inner ring 230, a seal member 262 is formed in a projecting manner on the elastic sleeve 260, and the construction is such that a bifurcated distal end of the seal member 262 is held in sliding contact with an inner surface of a rib 222 of the outer ring 220, thereby closing a clearance between the outer ring 220 and the inner ring 230. Further, at the other end in the axial direction, a slinger 270 is externally fitted to the inner ring 230 to be fixed thereto, and the construction is such that a distal end of an oil seal 272 attached to the outer ring is slidably contacted with the slinger 270 from the outside of the bearing, thereby closing a clearance between the outer ring 220 and the 230. Therefore, the clutch release bearing 210 has such a structure that lubricating oil is less liable to leak and that muddy water is less liable to intrude, and therefore it is thought that the good lubricating ability and water resistance can be maintained.

However, the clutch release bearing 210 shown in FIG. 10 has such a structure that the seal member 262 contacts the inner surface of the rib 222 of the outer ring 220, and therefore there is a problem that a torque loss develops by the friction between the rib 222 and the seal member 242 which friction is caused by the rotation of the outer ring 220.

Therefore, the problem that the present invention to solve is to provide a clutch release bearing in which a water resistance is enhanced, and also a torque loss is reduced.

Means for Solving the Problem

In order to solve the above problem, a clutch release bearing of the present invention employs the following means.

First, a first invention of the present invention is a clutch release bearing comprising an outer ring, an inner ring, a plurality of rolling elements rollably disposed between the outer ring and the inner ring, and a cage rotatably holding the rolling elements;

wherein a radially inwardly-extending outer ring rib is formed at one side end portion of the outer ring, and also a bearing-outward side face of the outer ring rib is formed as a contact surface which a rotating member of a clutch mechanism is adapted to contact, and at that side axially opposite from the one side where the outer ring rib is formed, there is provided a seal member fixed to the outer ring, and a seal lip formed at a radially-inward distal end of the seal member is constructed to be disposed in sliding contact with an outer peripheral surface of the inner ring; the clutch release bearing being characterized in that:

an annular mating member integral with the inner ring is provided at a bearing-outward side of the seal member, and an axial lip which extends toward the outside of the bearing and extends to be disposed radially outwardly of the mating member is formed at a bearing-outward side face of the seal member, and the axial lip is disposed in non-contact, close relation to the mating member to form a labyrinth, and a radially outwardly-open groove is formed in a joint portion of the axial lip joined to the seal member.

According to this first invention, the axial lip of the seal member extends to be disposed radially outwardly of the mating member, and covers a clearance between the axial lip and the mating member. Therefore, even when muddy water splashes on the bearing from the radially outward side, the muddy water is restrained from directly entering the clearance between the seal member and the mating member which clearance is covered by the axial lip. And, the radially outwardly-open groove is formed in the joint portion of the axial lip joined to the seal member, and therefore the muddy water splashed on the axial lip flows in the circumferential direction from the groove in the joint portion of the axial lip, and is discharged from the lower side of the bearing. Furthermore, the axial lip is disposed in non-contact, close relation to the mating member to form the labyrinth, and therefore the intrusion of the muddy water into the interior of the bearing through the clearance between the axial lip and the mating member is restrained.

Therefore, the water resistance of the clutch release bearing is enhanced.

Next, a second invention of the present invention is the clutch release bearing of the first invention which is characterized in that:

a groove is formed in the outside-diameter surface of the inner ring at a position disposed outwardly, with respect to the bearing, of the position where the seal lip of the seal member is disposed in sliding contact with the outside-diameter surface of the inner ring.

According to this second invention, even when muddy water enters the clearance between the seal member and the mating member, and reaches the outside-diameter surface of the inner ring, the muddy water flows in the circumferential direction through the groove formed in the outside-diameter surface of the inner ring at the position disposed outwardly, with respect to the bearing, of the position where the seal lip is held in sliding contact therewith, and is discharged from the lower side of the bearing. Therefore, the intrusion of the muddy water into the interior of the bearing from the position where the seal lip is disposed in sliding contact with the inner ring is restrained.

Next, a third invention of the present invention is the clutch release bearing of the first invention or the second invention which is characterized in that:

a concave portion or a convex portion is formed at the bearing-outward side face of the seal member at a position disposed radially inwardly of the axial lip on the bearing-outward side face of the seal member.

According to this third invention, the seal member is fixed to the outer ring, and rotates together with the outer ring, and therefore the concave portion or the convex portion formed at the bearing-outward side face of the seal member rotates, so that a flow of the air is produced in the clearance between the seal member and the mating member. Therefore, when muddy water intrudes into the clearance between the seal member and the mating member from the clearance between the axial lip and the mating member, the muddy water is guided toward the radially outward side of the bearing by a centrifugal force. Therefore, the intrusion of the muddy water radially inwardly from the clearance between the seal member and the mating member is restrained.

Next, a fourth invention of the present invention is the clutch release bearing of any one of the first invention to the third invention which is characterized in that:

the mating member and the seal member are disposed in non-contact, close relation to each other to form a labyrinth.

According to this fourth invention, the seal member and the mating member form the labyrinth, and therefore even when muddy water intrudes between the seal member and the mating member from the clearance between the axial lip and the mating member, the intrusion of the muddy water radially inwardly from the clearance between the seal member and the mating member is restrained.

Next, a fifth invention of the present invention is the clutch release bearing of any one of the first invention to the third invention which is characterized in that:

the mating member is a guide for smoothly effecting alignment of the clutch release bearing, and a slinger fixed to the inner ring and extending radially outwardly is provided between the seal member and the guide, and the seal member and the slinger are disposed in non-contact, close relation to each other in the axial direction to form a labyrinth, and the slinger and the guide are disposed in spaced-apart relation to each other in the axial direction such that a labyrinth is not formed.

According to this fifth invention, the slinger and the guide are disposed in spaced-apart relation to each other such that a labyrinth is not formed, and therefore the intrusion of muddy water is easy. On the other hand, the labyrinth is formed between the seal member and the slinger, and therefore the intrusion of muddy water is difficult. Therefore, even when muddy water intrudes between the seal member and the guide from the clearance between the axial lip and the guide, the muddy water is trapped by the clearance between the slinger and the guide, and is hard to intrude between the seal member and the slinger. Therefore, the intrusion of the muddy water radially inwardly from the clearance between the seal member and the slinger is restrained.

Next, a sixth invention of the present invention is the clutch release bearing of any one of the first invention to the third invention which is characterized in that:

the mating member is an inner ring rib formed on and extending radially outwardly from the inner ring, and a projecting portion increasing in diameter toward the inside of the bearing is formed at the inner ring rib, and a distal end of the projecting portion is disposed in non-contact, close relation to the bearing-outward side face of the seal member.

According to this sixth invention, the distal end of the projecting portion formed at the inner ring rib is disposed in non-contact, close relation to the bearing-outward side face of the seal member to form a labyrinth, and therefore muddy water intervening between the seal member and the inner ring rib is restrained from intruding radially inwardly. Furthermore, the projecting portion formed at the inner ring rib is increasing in diameter toward the inside of the bearing, and a groove is formed at a joint portion of the projecting portion, and therefore muddy water intervening radially outwardly of the projecting portion collects in the groove at the joint portion of the projecting portion, and flows in the circumferential direction, and is discharged to the lower side of the bearing.

Further, a seventh invention of the present invention is a clutch release bearing comprising an outer ring, an inner ring, and a plurality of rolling elements rollably disposed between the outer ring and the inner ring;

wherein a radially inwardly-extending outer ring rib is formed at one side end portion of the outer ring, and also a bearing-outward side face of the outer ring rib is formed as a contact surface which a diaphragm spring is adapted to contact, and at one side end portion of the inner ring which is disposed at the same side as the one side where the outer ring rib is formed, a radially inwardly-extending inner ring rib is formed in such a manner that it is spaced a predetermined distance from the outer ring rib; the clutch release bearing being characterized in that:

a seal member is provided to extend over the one side end portion of the inner ring and the inner ring rib, and an axial lip disposed in non-contact, close relation to a distal end of the outer ring rib, as well as a seal lip disposed in non-contact, close relation to a bearing-inward side face of the outer ring rib, is formed at the seal member.

According to this seventh invention, a labyrinth is formed between the distal end of the outer ring rib and the axial lip of the seal member, and therefore the intrusion of foreign matters such as muddy water into the interior of the bearing can be restrained. Furthermore, the bearing-inward side face of the outer ring rib and the seal lip of the seal member form a labyrinth, and therefore the flowing of lubricating oil such as grease out of the interior of the bearing can be restrained.

And, the axial lip and the seal lip of the seal member are both disposed in non-contact relation to the outer ring, and therefore the loss of a torque can be reduced as compared with the contact-type.

Therefore, there can be provided the clutch release bearing in which the good lubricating ability and water resistance can be maintained, and also the torque loss is reduced.

Next, an eighth invention of the present invention is the clutch release bearing of the first invention which is characterized in that a bearing-outward side of the distal end of the outer ring rib is chamfered to be inclining from the radially inward side toward the radially outward side from the inside of the bearing toward the outside of the bearing.

According to this eighth invention, the bearing-outward side of the distal end of the outer ring rib is chamfered to be inclining from the radially inward side toward the radially outward side from the inside of the bearing toward the outside of the bearing. Therefore, foreign matters such as muddy water intervening near to the chamfered portion of the bearing-outward side of the distal end of the outer ring rib are guided radially outwardly of the bearing and toward the outside of the bearing by a centrifugal force produced by the rotation of the outer ring, and therefore the waterproof performance of the clutch release bearing is further enhanced.

Next, a ninth invention of the present invention is the clutch release bearing of the first invention or the second invention which is characterized in that the range of that portion of the distal end of the outer ring rib disposed in non-contact, close relation to the axial lip of the seal member is formed into a small width in the axial direction.

According to this ninth invention, the axial width of the region where the distal end of the outer ring rib and the axial lip are disposed in non-contact, close relation to each other is small, and therefore even when the outer ring rib is deformed at the time of transmission of a torque from the diaphragm spring, so that the distal end of the outer ring rib is brought into contact with the axial lip, the width of contacting is small, and a torque loss due to a contact resistance can be kept to a low level.

Advantage of the Invention

According to the above-mentioned inventions of the present invention, the following advantages can be obtained.

First, according to the above first invention, even when muddy water splashes on the bearing from the radially outward side, the muddy water is restrained from directly entering the clearance between the seal member and the mating member which clearance is covered by the axial lip. And, the muddy water splashed on the axial lip flows in the circumferential direction from the groove in the joint portion of the axial lip, and is discharged from the lower side of the bearing. Furthermore, the axial lip and the mating member form the labyrinth, and therefore the intrusion of the muddy water into the interior of the bearing through the clearance between the axial lip and the mating member is restrained. Therefore, the water resistance of the clutch release bearing is enhanced, and the good lubricating ability and water resistance can be maintained.

Next, according to the above second invention, even when muddy water enters the clearance between the seal member and the mating member, and reaches the outside-diameter surface of the inner ring, the muddy water flows in the circumferential direction through the groove formed in the outside-diameter surface of the inner ring at the position disposed outwardly, with respect to the bearing, of the position where the seal lip is held in sliding contact therewith, and is discharged from the lower side of the bearing. Therefore, the intrusion of the muddy water into the interior of the bearing from the position where the seal lip is disposed in sliding contact with the inner ring is restrained.

Next, according to the above third invention, the concave portion or the convex portion formed at the bearing-outward side face of the seal member rotates, and therefore when muddy water intrudes into the clearance between the seal member and the mating member from the clearance between the axial lip and the mating member, the muddy water is guided toward the radially-outward side of the bearing by a centrifugal force. Therefore, even when the muddy water intrudes into the clearance between the seal member and the mating member from the clearance between the axial lip and the mating member, the radially-inward intrusion of the muddy water between the seal member and the mating member is restrained.

Next, according to the above fourth invention, the seal member and the mating member form the labyrinth, and therefore even when muddy water intrudes between the seal member and the mating member from the clearance between the axial lip and the mating member, the intrusion of the muddy water radially inwardly from the clearance between the seal member and the mating member is restrained.

Next, according to the above fifth invention, even when muddy water intrudes between the seal member and the guide from the clearance between the axial lip and the guide, the muddy water is trapped by the clearance between the slinger and the guide, and is hard to intrude between the seal member and the slinger. Therefore, the intrusion of the muddy water radially inwardly from the clearance between the seal member and the slinger is restrained.

Next, according to the above sixth invention, the projecting portion formed at the inner ring rib and the seal member form the labyrinth, and therefore muddy water intervening between the seal member and the inner ring rib is restrained from intruding radially inwardly. Furthermore, the projecting portion formed at the inner ring rib is increasing in diameter toward the inside of the bearing, and the groove is formed at the joint portion of the projecting portion, and therefore muddy water intervening radially outwardly of the projecting portion collects in the groove at the joint portion of the projecting portion, and flows in the circumferential direction, and is discharged to the lower side of the bearing.

First, according to the above seventh invention, the labyrinth is formed between the distal end of the outer ring rib and the axial lip of the seal member, and therefore the intrusion of foreign matters such as muddy water into the interior of the clutch release bearing can be restrained. Furthermore, the bearing-inward side face of the rib of the outer ring and the seal lip of the seal member form the labyrinth, and therefore the flowing of lubricating oil such as grease out of the interior of the bearing can be restrained. And, the axial lip and the seal lip of the seal member are both disposed in non-contact relation to the outer ring, and therefore the loss of the torque can be reduced as compared with the contact-type. Therefore, there can be provided the clutch release bearing in which the good lubricating ability and water resistance can be maintained, and also the torque loss is reduced.

Next, according to the above eighth invention, foreign matters such as muddy water intervening near to the chamfered portion of the bearing-outward side of the distal end of the outer ring rib are guided radially outwardly of the bearing and toward the outside of the bearing by a centrifugal force produced by the rotation of the outer ring, and therefore the waterproof performance of the clutch release bearing is further enhanced.

Next, according to the above ninth invention, even when the outer ring rib is deformed at the time of transmission of the torque from the diaphragm spring, so that the distal end of the outer ring rib is brought into contact with the axial lip, the width of contacting is small, and the torque loss due to the contact resistance can be kept to a low level, and the good lubricating ability and water resistance can be maintained.

MODE FOR CARRYING OUT THE INVENTION

A best mode for carrying out the present invention will hereafter be described by way of embodiments.

Embodiment 1

Figure 1:
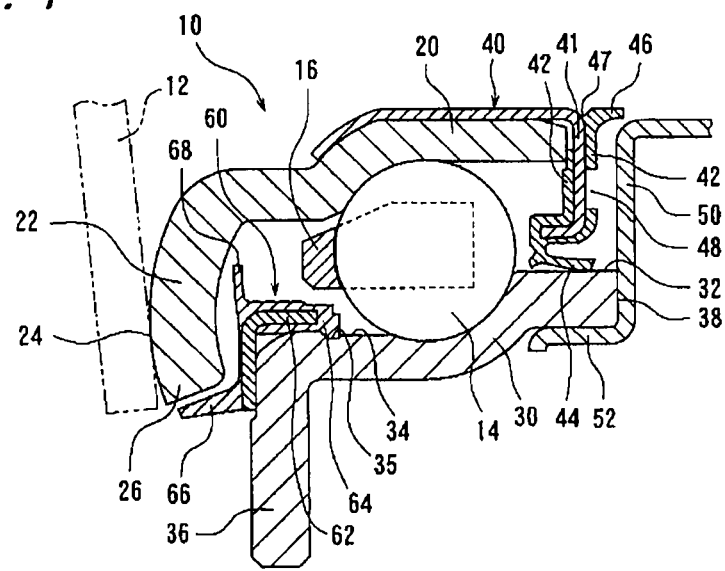
FIG. 1 This is a fragmentary cross-sectional view of a clutch release bearing of an embodiment 1.

First, an embodiment 1 will be described. A fragmentary cross-sectional view of a clutch release bearing 10 according to the embodiment 1 of the present invention is shown in FIG. 1. The clutch release bearing 10 is a clutch release bearing of the outer ring-rotating type which comprises an outer ring 20, an inner ring 30, a plurality of balls (rolling elements) 14 rollably disposed between the outer ring 20 and the inner ring 30, and a cage 16 rotatably holding the balls 14. A radially inwardly-extending outer ring rib 22 is formed at one side end portion of the outer ring 20, and also an axially-outward side face of the outer ring rib 22 is formed as a contact surface 24 which a diaphragm spring 12 is adapted to contact. This diaphragm spring 12 is a rotating member of a clutch mechanism of the present invention. Incidentally, the outer ring 20 and the inner ring 30 are formed by press working.

At that side axially opposite from the one side where the outer ring rib 22 is formed, there is provided a first seal member 40 externally fitted to the outer ring 20 to be fixed thereto. This first seal member 40 is a seal member of the present invention. The first seal member 40 is an annular member of a generally L-shaped cross-section, and has a rubber-made covering portion 42 attached to a metal core 41 made of metal. A seal lip 44 integral with the covering portion 42 is formed at a radially-inward distal end of the first seal member 40, and the seal lip 44 is constructed to be disposed in sliding contact with an outside-diameter surface 32 of the inner ring 30.

An annular guide 50 for smoothing the alignment at the time of axial movement of the clutch release bearing 10 is provided at the bearing-outward side the first seal member 40. This guide 50 is a mating member of the present invention. A flange 52 formed at an inside-diameter side of the guide 50 is press-fitted in an inside-diameter side of the inner ring 30, so that the guide 50 and the inner ring 30 are integrally joined together. An axial lip 46 which extends toward the outside of the bearing and extends to be disposed radially outwardly of the guide 50 is formed at a bearing-outward side face of the first seal member 40. The axial lip 46 is disposed in non-contact, close relation to the guide 50 to form a labyrinth. An outside-diameter surface of the axial lip 46 is disposed parallel to the axial direction, and a radially outwardly-open groove 47 is formed in a joint portion of the axial lip 46 joined to the first seal member 40.

In the embodiment 1, although the covering portion 42, the seal lip 44 and the axial lip 46 of the first seal member 40 are made of rubber, these may be made of a soft resin.

The first seal member 40 and the guide 50 are disposed in non-contact, close relation to each other in the axial direction to form the labyrinth.

Figure 2:
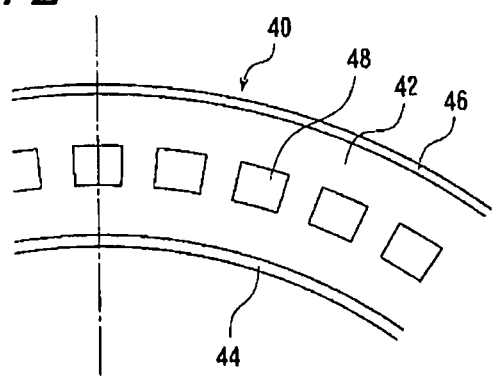
FIG. 2 This is a fragmentary plan view of a seal member of the clutch release bearing of the embodiment 1 as seen from the outside of the bearing.

Concave portions 48 of a rectangular shape formed by removing corresponding portions from the covering portion 42 at the bearing-outward side face of the first seal member 40 are formed respectively at positions disposed radially inwardly of the axial lip 46 on the bearing-outward side face of the first seal member 40. A fragmentary plan view of the first seal member 40 as seen from the outside of the bearing is shown in FIG. 2. As shown in FIG. 2, the concave portions 48 are formed on a common circle at substantially equal intervals.

As shown in FIG. 1, at one side end portion of the inner ring 30 which is disposed at the same side as the one side where the outer ring rib 22 is formed, a radially inwardly-extending inner ring rib 36 is formed in such a manner that it is spaced a predetermined distance from the outer ring rib 22. A cylindrical tubular portion 34 which extends from the inner ring rib 36 toward the inside of the bearing and is parallel to the axial direction is formed at the inner ring 30.

A second seal member 60 is provided to extend over the tubular portion 34 and the inner ring rib 36 of the inner ring 30. The second seal member 60 is an annular member having a rubber-made covering portion 64 attached to a metal core 62 made of metal, and is press-fitted to the inner ring 30 from that side where the inner ring rib 36 is formed, and is engaged in an engagement groove 35 formed in the tubular portion 34 of the inner ring 30, and is fixed to the inner ring 30. The second seal member 60 includes a rubber-made axial lip 66 formed integrally with the covering portion 64, and a rubber-made seal lip 68 formed integrally with the covering portion 64.

The axial lip 66 is constructed such that it is disposed close to a distal end 26 of the outer ring rib 22 with a narrow space formed therebetween, and is disposed in non-contact relation to the outer ring 20, and the seal lip 68 is constructed such that it is disposed close to a bearing-inward side face of the outer ring rib 22 with a narrow space formed therebetween, and is disposed in non-contact relation to the outer ring rib 22.

In this embodiment 1, the axial lip 46 of the first seal member 40 extends to be disposed radially outwardly of the guide 50. Therefore, even if muddy water splashes on the clutch release bearing 10 from the radially-outward side, the muddy water is restrained from directly intruding into the clearance between the first seal member 40 and the guide 50 which clearance is covered by the axial lip 46 of the first seal member 40. And, since the radially outwardly-open groove 47 is formed in the joint portion of the axial lip 46 joined to the first seal member 40, the muddy water splashed on the axial lip 46 flows from the groove 47 in the joint portion of the axial lip 46 in the circumferential direction, and is discharged from the lower side of the clutch release bearing 10. And, the axial lip 46 is disposed in non-contact, close relation to the guide 50 to form the labyrinth, and therefore the intrusion of the muddy water into the interior of the bearing from the clearance between the axial lip 46 and the guide 50 is restrained.

According to the embodiment 1, the first seal member 40 and the guide 50 are disposed in non-contact, close relation to each other in the axial direction to form the labyrinth, and therefore even when muddy water intrudes between the first seal member 40 and the guide 50 from the clearance between the axial lip 46 and the guide 50, the intrusion of the muddy water toward the radially-inward side of the bearing from the clearance between the first seal member 40 and the guide 50 is restrained.

Furthermore, according to the embodiment 1, the first seal member 40 is fixed to the outer ring 20, and rotates together with the outer ring 20, and therefore the concave portions 48 formed in the bearing-outward side face of the first seal member 40 rotate, so that a flow of the air in the circumferential direction is produced in the clearance between the first seal member 40 and the guide 50. Therefore, when muddy water intrudes into the clearance between the first seal member 40 and the guide 50 from the clearance between the axial lip 46 and the guide 50, the muddy water is guided radially outwardly of the bearing by the centrifugal force. Therefore, the intrusion of the muddy water from the clearance between the first seal member 40 and the guide 50 toward the radially-inward side of the bearing is restrained.

Therefore, according to the embodiment 1, the water resistance of the clutch release bearing is enhanced.

In the embodiment 1, although the concave portions 48 are provided in the side face of the first seal member 40, there may be provided such a construction that instead of the concave portions 48, convex portions are provided so as to produce a flow of the air in the circumferential direction. Also, in the embodiment 1, although the outside-diameter surface of the axial lip 46 is disposed parallel to the axial direction, the outside-diameter surface of the axial lip 46 may be increasing in diameter toward the outside of the bearing. If there is provided the construction in which the outside-diameter surface of the axial lip 46 is increasing in diameter toward the outside of the bearing, muddy water deposited on the outside-diameter surface of the axial lip 46 easily collects in the groove 47.

Embodiment 2

Figure 3:
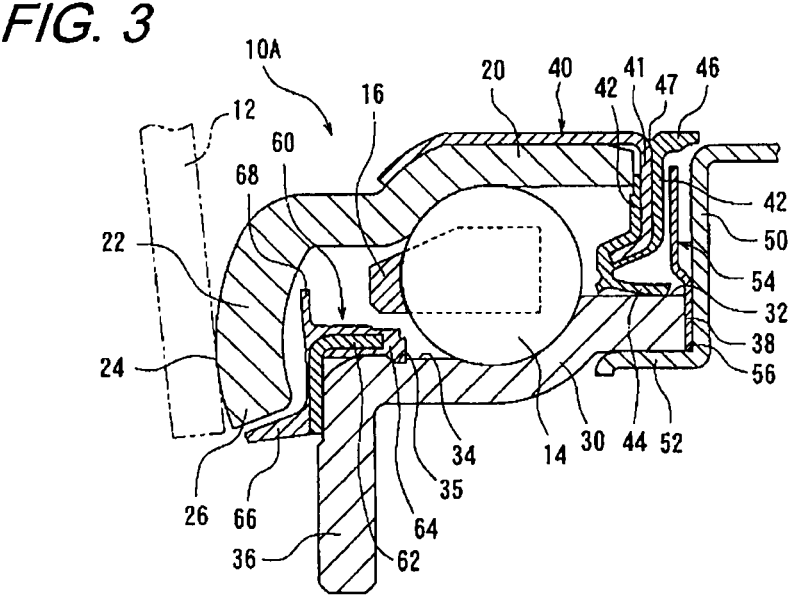
FIG. 3 This is a fragmentary cross-sectional view of a clutch release bearing of an embodiment 2.

Next, an embodiment 2 will be described. A fragmentary cross-sectional view of a clutch release bearing 10A according to the embodiment 2 of the present invention is shown in FIG. 3. As compared with the clutch release bearing 10 of the embodiment 1, the clutch release bearing 10A is characterized in that a radially outwardly-extending metallic slinger 54 is provided between a first seal member 40 and a guide 50 and that the concave portions 48 are not formed in the bearing-outward side face of the first seal member 40.

An inside-diameter portion 56 of the slinger 54 is externally fitted to a flange 52 of the guide 50, and in this condition the flange 52 of the guide 50 is press-fitted into an inside-diameter surface of an inner ring 30, and by doing so, the slinger is integrally joined to the inner ring 30 and the guide 50.

At its inside-diameter side, the slinger 54 is held between an end portion 38 of the inner ring 30 and a bearing-inward side face of the guide 50. And, it is inclined toward the inward side of the bearing to be spaced from the side face of the guide 50 at its portion disposed radially outwardly of an outside-diameter surface 32 of the inner ring 30, and is disposed perpendicular to the axial direction at its outside-diameter side. A radially-outward distal end of the slinger 54 is disposed in non-contact relation to an axial lip 46 of the first seal member 40. The first seal member 40 and the slinger 54 are disposed in non-contact, close relation to each other in the axial direction to form a labyrinth, and the slinger 54 and the guide 50 are disposed in spaced-apart relation to each other in the axial direction such that a labyrinth is not formed.

A seal lip 44 formed at a radially-inward distal end of the first seal member 40 is formed into such a shape that it is small in thickness, has a long leg and is low in rigidity, and it is disposed in light contact with the outside-diameter surface 32 of the inner ring 30 so as to achieve a low-torque design.

In addition, the other construction of the clutch release bearing 10A is similar to that of the clutch release bearing 10 of the embodiment 1, and therefore detailed description will be omitted while applying identical reference numerals.

According to this embodiment 2, the axial lip 46 of the first seal member 40 extends to be disposed radially outwardly of the guide 50. Therefore, even if muddy water splashes on the clutch release bearing 10A from the radially-outward side, the muddy water is restrained from directly intruding into the clearance between the first seal member 40 and the guide 50 which clearance is covered by the axial lip 46 of the first seal member 40. And, since a radially outwardly-open groove 47 is formed in a joint portion of the axial lip 46 joined to the first seal member 40, the muddy water splashed on the axial lip 46 flows from the groove 47 in the joint portion of the axial lip 46 in the circumferential direction, and is discharged from the lower side of the clutch release bearing 10A.

And, the axial lip 46 is disposed in non-contact, close relation to the guide 50 to form the labyrinth, and therefore the intrusion of the muddy water toward the radially-inward side of the bearing from the clearance between the axial lip 46 and the guide 50 is restrained.

And, according to the embodiment 2, the slinger 54 and the guide 50 are disposed in spaced-apart relation to each other in the axial direction such that a labyrinth is not formed, and therefore the intrusion of muddy water is easy. On the other hand, the labyrinth is formed between the first seal member 40 and the slinger 54, and therefore the intrusion of muddy water is difficult. Therefore, even when muddy water intrudes between the first seal member 40 and the guide 50 from the clearance between the axial lip 46 and the guide 50, the muddy water is trapped by the clearance between the slinger 54 and the guide 50, and is hard to intrude between the first seal member 40 and the slinger 54. Then, the muddy water trapped by the clearance between the slinger 54 and the guide 50 flows in the circumferential direction, and is discharged from the lower side of the clutch release bearing 10A. Therefore, the intrusion of the muddy water toward the radially-inward side of the bearing from the clearance between the first seal member 40 and the slinger 54 is restrained.

In the embodiment 2, although the construction is such that the concave portions 48 are not formed in the bearing-outward side face of the first seal member 40, there may be provided such a construction that the concave portions 48 are formed in the bearing-outward side face of the first seal member 40 in a similar manner to the embodiment 1. Also, there may be provided such a construction that instead of the concave portions 48, convex portions are provided so as to produce a flow of the air in the circumferential direction.

And, the outside-diameter surface of the axial lip 46 may be increasing in diameter toward the outside of the bearing. If there is provided the construction in which the outside-diameter surface of the axial lip 46 is increasing in diameter toward the outside of the bearing, muddy water deposited on the outside-diameter surface of the axial lip 46 easily collects in the groove 47 in the joint portion of the axial lip 46.

Therefore, according to the embodiment 2, the water resistance of the clutch release bearing is enhanced, and deterioration of grease is restrained, and a shortened life of the bearing is restrained. Furthermore, the generation of an abnormal sound is restrained by the restraint of the deterioration of the grease.

Embodiment 3

Figure 4:
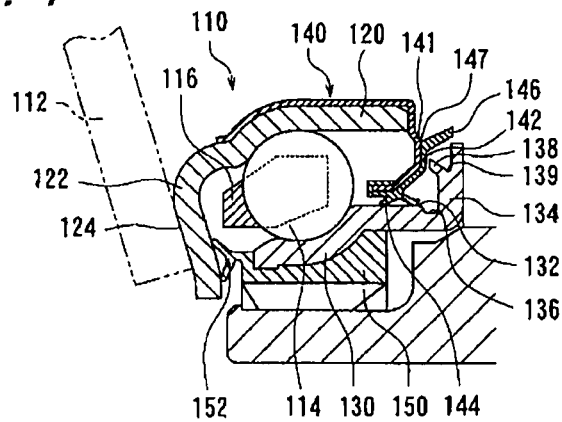
FIG. 4 This is a fragmentary cross-sectional view of a clutch release bearing of an embodiment 3.

Finally, an embodiment 3 will be described. A fragmentary cross-sectional view of a clutch release bearing 110 according to the embodiment 3 of the present invention is shown in FIG. 4. The clutch release bearing 110 is a clutch release bearing of the outer ring-rotating type which comprises an outer ring 120, an inner ring 130, a plurality of balls (rolling elements) 114 rollably disposed between the outer ring 120 and the inner ring 130, and a cage 116. A radially inwardly-extending outer ring rib 122 is formed at one end portion of the outer ring 120, and also a bearing-outward side face of the outer ring rib 122 is formed as a contact surface 124 which a diaphragm spring 112 is adapted to contact. This diaphragm spring 112 is a rotating member of a clutch mechanism of the present invention. Incidentally, the outer ring 120 and the inner ring 130 are formed by press working.

At that side axially opposite from the one side where the outer ring rib 122 is formed, there is provided a first seal member 140 externally fitted to the outer ring 120 to be fixed thereto. This first seal member 140 is a seal member of the present invention. The first seal member 140 is an annular member, and has a rubber-made covering portion 142 attached to a metal core 141 made of metal. A seal lip 144 integral with the covering portion 142 is formed at a radially-inward distal end of the first seal member 140, and the seal lip 44 is constructed to be disposed in sliding contact with an outside-diameter surface 132 of the inner ring 130. A groove 136 is formed in the outside-diameter surface 132 of the inner ring 130 at a position disposed outwardly, with respect to the bearing, of the position where the seal lip 144 of the first seal member 140 is held in sliding contact with the outside-diameter surface 132 of the inner ring 130.

An inner ring rib 134 formed by radially outwardly extending an end portion of the inner ring 130 is provided at the bearing-outward side of the first seal member 140 in non-contact relation to the first seal member 140. This inner ring rib 134 is a mating member of the present invention.

An axial lip 146 which extends toward the outside of the bearing while increasing in diameter and extends to be disposed radially outwardly of the inner ring rib 134 is formed at a bearing-outward side face of the first seal member 140, and the axial lip 146 is disposed in non-contact, close relation to the inner ring rib 134 to form a labyrinth. And, the axial lip 146 is constructed to be increasing in diameter toward the outside of the bearing, and therefore a groove 147 is formed in a radially-outward side of a joint portion of the axial lip 146 joined to the first seal member 140.

A projecting portion 138 increasing in diameter toward the inside of the bearing is formed at the inner ring rib 134 by stamping-out, and a distal end of the projecting portion 138 is disposed in non-contact, close relation to the bearing-outward side face of the first seal member 140.

An elastic sleeve 150 for self-aligning purposes is fixed to the inner periphery of the inner ring 130, and at one end portion of the inner ring 130 which is disposed at the same side as that side where the outer ring rib 122 is formed, a seal lip 152 is formed in a projecting manner at the elastic sleeve 150, and a bifurcated distal end of the seal lip 152 is lightly contacted with and therefore is disposed in contact with an inner surface of the outer ring rib 122.

According to this embodiment 3, the axial lip 146 of the first seal member 140 extends to be disposed radially outwardly of the inner ring rib 134. Therefore, even if muddy water splashes on the clutch release bearing 110 from the radially-outward side, the muddy water is restrained from directly intruding into a clearance between the first seal member 140 and the inner ring rib 134 which clearance is covered by the axial lip 146 of the first seal member 140. And, the groove 147 is formed in the radially-outward side of the joint portion of the axial lip 146 joined to the first seal member 146 since the axial lip 146 is constructed to be increasing in diameter toward the outside of the bearing, and therefore the muddy water splashed on the axial lip 146 flows from the groove 147 in the joint portion of the axial lip 146 in the circumferential direction, and is discharged from the lower side of the clutch release bearing 110. And, the axial lip 146 is disposed in non-contact, close relation to the inner ring rib 134 to form the labyrinth, and therefore the intrusion of the muddy water toward the radially-inward side of the bearing from the clearance between the axial lip 146 and the inner ring rib 134 is restrained.

The distal end of the projecting portion 138 formed at the inner ring rib 134 is disposed in non-contact, close relation to the bearing-outward side face of the first seal member 140 to form the labyrinth, and therefore the muddy water intervening between the first seal member 140 and the inner ring rib 134 is restrained from intruding radially inwardly. Furthermore, the projecting portion 138 formed at the inner ring rib 134 is constructed to be increasing in diameter toward the inside of the bearing, and therefore a groove 139 is formed at a radially-outward side of a joint portion of the projecting portion 138, and the muddy water intervening at the radially-outward side of the projecting portion 138 collects in the groove 139 in the joint portion of the projecting portion 138, and flows in the circumferential direction, and is discharged to the lower side of the bearing.

Furthermore, even when muddy water intrudes into the interior of the bearing from the clearance between the first seal member 140 and the inner ring rib 134, and reaches the outside-diameter surface 132 of the inner ring 130, the muddy water flows in the circumferential direction through the groove 136 formed in the outside-diameter surface 132 of the inner ring 130 at the position disposed outwardly, with respect to the bearing, of the position where the seal lip 144 of the first seal member 140 is held in sliding contact therewith, and is discharged from the lower side of the bearing. Therefore, the intrusion of the muddy water into the interior of the bearing from the region where the seal lip 144 is disposed in sliding contact with the inner ring 130 is restrained.

Therefore, the water resistance of the clutch release bearing is enhanced, which leads to a prolonged life and the enhanced reliability.

Although the embodiments of the present invention have been described above, the clutch release bearing of the present invention is not limited to each of the above embodiments. For example, with respect to the embodiment 1 or the embodiment 2, there can be provided a construction in which a groove is formed in that portion of the outside-diameter surface 32 of the inner ring 30 disposed outwardly, with respect to the bearing, of the position where the seal lip 44 of the first seal member 40 is disposed in sliding contact therewith. Alternatively, there can be provided a construction in which the outside diameter-side of the end portion 38 of the inner ring 30 is chamfered, and a groove is formed by the chamfered portion and the side face of the guide 50 or the slinger 54.

Embodiment 4

Figure 5:
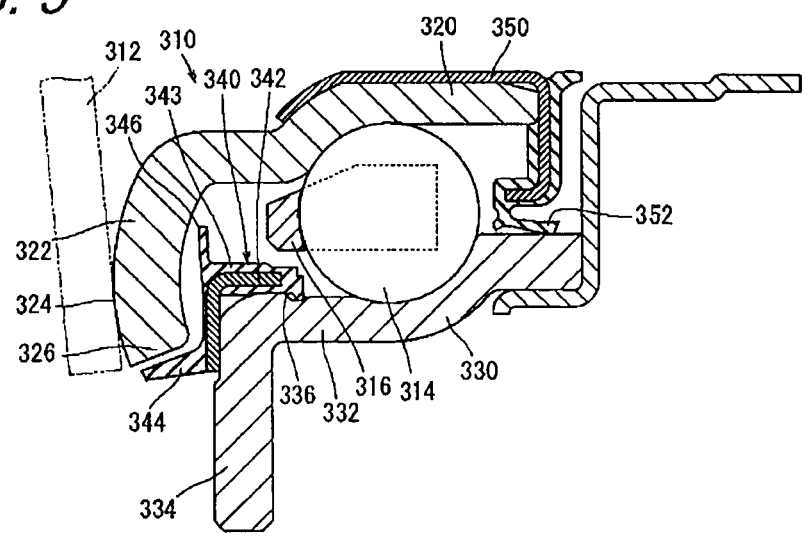
FIG. 5 This is a fragmentary cross-sectional view of a clutch release bearing of an embodiment 4

A fragmentary cross-sectional view of a clutch release bearing 310 according to an embodiment 4 of the present invention is shown in FIG. 5. The clutch release bearing 310 is a clutch release bearing of the outer ring-rotating type which comprises an outer ring 320, an inner ring 330, a plurality of balls (rolling elements) 314 rollably disposed between the outer ring 320 and the inner ring 330, and a cage 316.

A radially inwardly-extending outer ring rib 322 is formed at one end portion of the outer ring 320, and also a bearing-outward side face of the outer ring rib 322 is formed as a contact surface 324 which a diaphragm spring 312 is adapted to contact. At one side end portion of the inner ring 330 which is disposed at the same side as the one side where the outer ring rib 322 is formed, a radially inwardly-extending rib 334 is formed in such a manner that it is spaced a predetermined distance from the outer ring rib 322. A cylindrical tubular portion 332 extending from the inner ring rib 334 toward the inside of the bearing is formed at the inner ring 330 in the axial direction.

Incidentally, the outer ring 320 and the inner ring 330 are formed by press working.

A first seal member 340 is provided to extend over the tubular portion 332 of the inner ring 330 and the inner ring rib 334 of the inner ring 30. This first seal member 340 corresponds to a seal member of the present invention. This first seal member 340 is an annular member having a rubber-made covering portion 343 attached to a metal core 342 made of metal, and is press-fitted to the inner ring 330 from that side where the inner ring rib 334 is formed, and is engaged in an engagement groove 336 formed in the tubular portion 332 of the inner ring 330 and is fixed to the inner ring 330. The first seal member 340 includes a rubber-made axial lip 344 formed integrally with the covering portion 343, and a rubber-made seal lip 346 formed integrally with the covering portion 343.

The axial lip 344 is constructed such that it is disposed close to a distal end 326 of the outer ring rib 322 with a narrow space formed therebetween, and is disposed in non-contact relation to the outer ring 320, and the seal lip 346 is constructed such that it is disposed close to a bearing-inward side face of the outer ring rib 322 with a narrow space formed therebetween, and is disposed in non-contact relation to the outer ring rib 322.

In the embodiment 4, although the covering portion 343, the axial lip 344 and the seal lip 346 are made of rubber, these may be made of a soft resin.

At the other end portion of the clutch release bearing 310, there is provided a second seal member 350 externally fitted to the outer ring 320, and the construction is such that a seal lip 352 formed at a distal end of the second seal member 350 is disposed in sliding contact with the outer peripheral surface of the inner ring 330.

According to the clutch release bearing 310 of this embodiment 4, a labyrinth is formed between the distal end 326 of the outer ring rib 322 and the axial lip 344 of the first seal member 340, and therefore the intrusion of foreign matters such as muddy water into the interior of the clutch release bearing 310 can be restrained. Also, the bearing-inward side face of the outer ring rib 322 and the seal lip 346 of the first seal member 340 form a labyrinth, and therefore the flowing of lubricating oil such as grease out of the interior of the bearing can be restrained. And, the axial lip 344 and the seal lip 346 of the first seal member 340 are both disposed in non-contact with the outer ring rib 322, and therefore as compared with the case where a contact-type seal member is used, the loss of a torque can be reduced. Furthermore, by forming the seal lip 346, provided at the bearing-inward side of the outer ring rib 322, into the non-contact type, the need for thickening the seal lip in order to take precautions against deformation due to wear and so on as in the contact-type is obviated, and the seal lip 346 can be thinned, and therefore as compared with the contact-type, the volume of the seal lip 346 is reduced, and the capacity of the lubricating oil such as grease to be sealed in can be increased.

Therefore, there can be provided the clutch release bearing in which the good lubricating ability and water resistance can be maintained, and also the torque loss is reduced.

Embodiment 5

Figure 6:
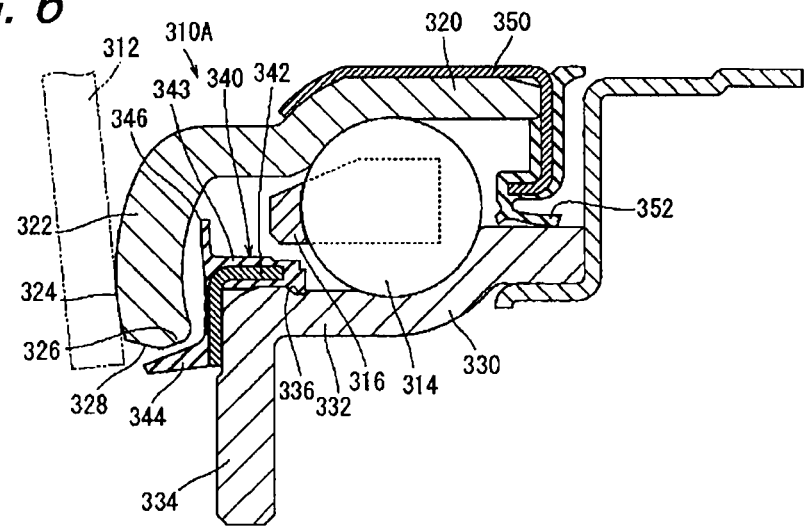
FIG. 6 This is a fragmentary cross-sectional view of a clutch release bearing of an embodiment 5.

A fragmentary cross-sectional view of a clutch release bearing 310A according to an embodiment 5 of the present invention is shown in FIG. 6. The clutch release bearing 310A is characterized in that a chamfered portion 328 chamfered to be inclining from a radially inward side toward a radially outward side toward the outside of the bearing is formed at a bearing-outward side of a distal end 326 of an outer ring rib 322. The other construction of the clutch release bearing 310A of the embodiment 5 is similar to that of the clutch release bearing 310 of the embodiment 4, and therefore detailed description will be omitted while applying identical reference numerals.

In the embodiment 5, by providing the chamfered portion 328 at the bearing-outward side of the distal end 326 of the outer ring rib 322, foreign matters such as muddy water intervening near to the chambered portion 328 of the distal end 326 of the outer ring rib 322 are guided radially outwardly of the bearing and toward the outside of the bearing by a centrifugal force produced by the rotation of an outer ring 320, and therefore a waterproof performance of the clutch release bearing 310A is further enhanced.

Embodiment 6

Figure 7:
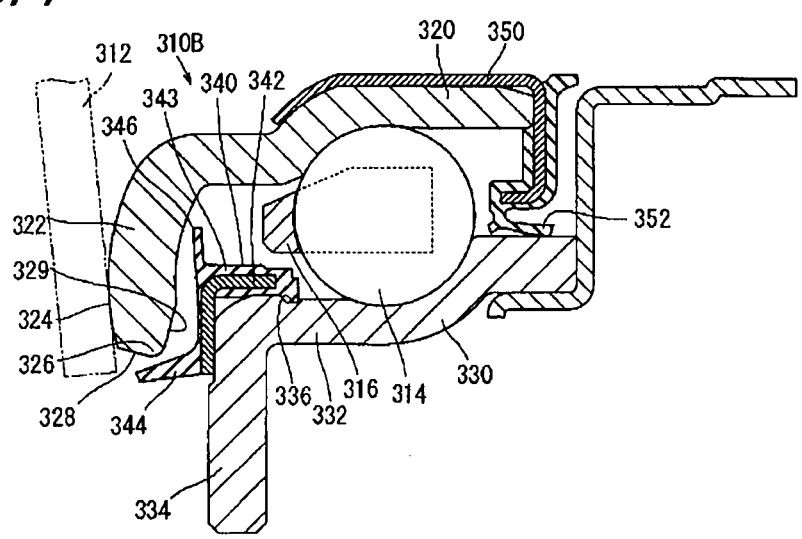
FIG. 7 This is a fragmentary cross-sectional view of a clutch release bearing of an embodiment 6.

A fragmentary cross-sectional view of a clutch release bearing 310B according to an embodiment 6 of the present invention is shown in FIG. 7. In the clutch release bearing 310B, a bearing-outward side of a distal end 326 of an outer ring rib 322 is chamfered in a similar manner to the embodiment 5 to form a chamfered portion 328, and further a bearing-inward side of the distal end 326 of the outer ring rib 322 is chambered to form a chamfered portion 329. There is a feature that the range of that portion of the distal end 326 of the outer ring rib 322 disposed in non-contact, close relation to an axial lip 344 of a first seal member 340 is formed into a small width in an axial direction.

Except that both sides of the distal end 322 of the outer ring rib 322 are chamfered, the clutch release bearing 310B of the embodiment 6 is similar in construction to the clutch release bearing 310 of the embodiment 4, and therefore detailed description will be omitted while applying identical reference numerals.

In the embodiment 6, chamfering is provided at both sides of the distal end 326 of the outer ring rib 322, and the range of the portion of the distal end 326 of the outer ring rib 322 disposed in non-contact, close relation to the axial lip 344 of the first seal member 340 is formed into the small width in the axial direction, and therefore even when the outer ring rib 322 is deformed at the time of transmission of a torque from a diaphragm spring 312, so that the distal end 326 of the outer ring rib 322 is brought into contact with the axial lip 344, a torque loss due to contact friction can be kept to a low level since the width of contacting is small.

Next, modified embodiments of the present invention will be described with reference to FIGS. 8(A) to (D).

Figure 8:
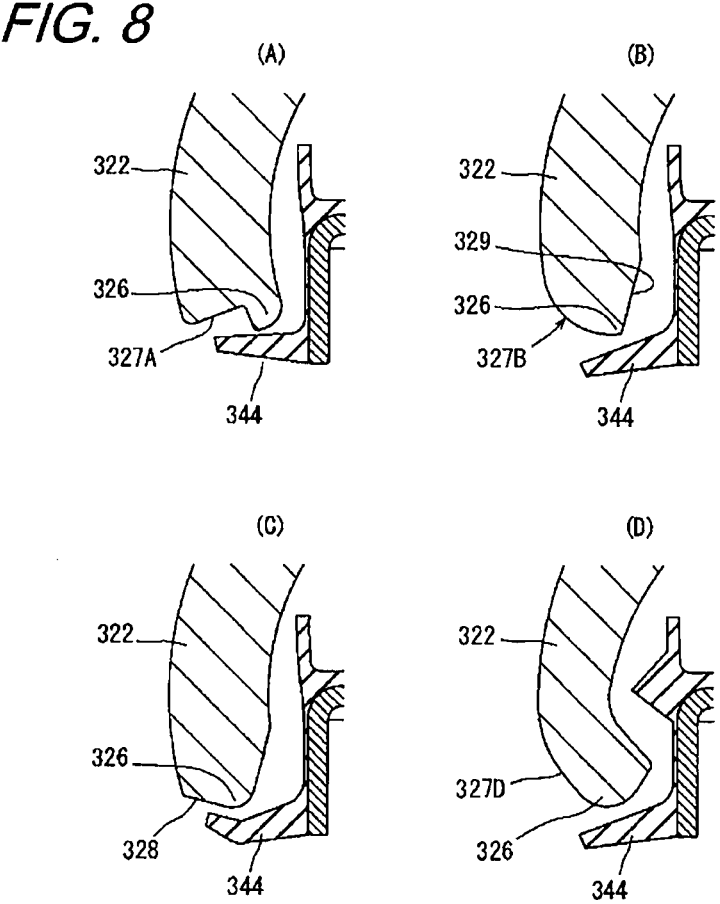
FIG. 8 This is cross-sectional views showing part of clutch release bearings of modified embodiments.
Figure 9:
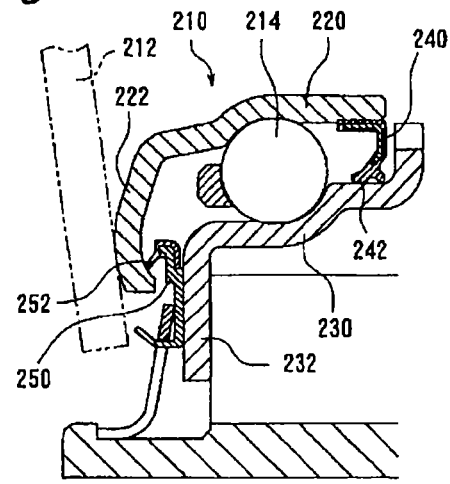
FIG. 9 This is a fragmentary cross-sectional view of a clutch release bearing of a conventional technique.
Figure 10:
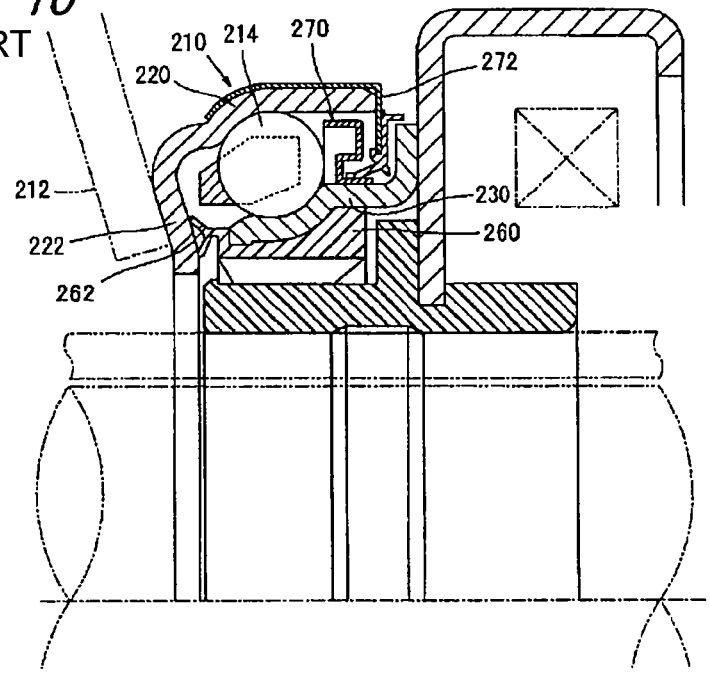
FIG. 10 This is a fragmentary cross-sectional view of a clutch release bearing of a conventional technique.

FIG. 8(A) shows an example in which the construction is such that a bearing-outward side of a distal end 326 of an outer ring rib 322 is notched into a rectangular shape to form a notched portion 327A, thereby reducing the axial width of the distal end 326 of the outer ring rib 322, and the direction of extending of an axial lip 344 opposed to the distal end 326 of the outer ring rib 322 is disposed generally parallel to the axis. With this construction, also, a torque loss, produced when the outer ring rib 322 is deformed at the time of transmission of the torque from a diaphragm spring 312, so that the distal end 326 of the outer ring rib 322 is brought into contact with the axial lip 344, can be kept to a low level.

FIG. 8(B) shows an example in which an arc-like portion 327B of a generally arc-shape is formed at a bearing-outward side of a distal end 326 of an outer ring rib 322, and a bearing-inward side of the outer ring rib 322 is chamfered to form a chamfered portion 329. In this construction, the arc-like portion 327B can be shaped by press-working the outer ring 320, and therefore the working of the outer ring 320 is easier as compared with the case where chamfering is effected.

FIG. 8(C) shows a construction in which both sides of a distal end 326 of an outer ring rib 322 are chamfered, and in addition a distal end of an axial lip 344 is bent radially outwardly. With this construction, a labyrinth formed by a chamfered portion 328 and the axial lip 344 is inclining radially outwardly toward the outside of the bearing, and therefore there is an advantage that foreign matters such as muddy water intervening in the labyrinth are guided toward the outside of the bearing by a centrifugal force produced by the rotation of an outer ring 320.

FIG. 8(D) shows an example in which an inclining portion 327D inclining from the inside of the bearing toward the outside of the bearing and from a radially-inward side toward a radially-outward side is formed at a bearing-outward side of a distal end 326 of an outer ring rib 322 by bending. Since the inclining portion is formed by bending, the working of the outer ring 320 is easier as compared with the case where the inclining portion is formed by chamfering effected by cutting.

Besides, the clutch release bearings of the present invention can be provided in various forms within the scope of the concept of the invention.

The invention claimed is:

1. A clutch release bearing comprising:
an outer ring,
an inner ring,
a plurality of rolling elements rollably disposed between the outer ring and the inner ring, and
a cage rotatably holding the rolling elements;
wherein a radially inwardly-extending outer ring rib is formed at one side end portion of said outer ring, and also a bearing-outward side face of said outer ring rib is formed as a contact surface which a rotating member of a clutch mechanism is adapted to contact, and at a side axially opposite from the one side where said outer ring rib is formed, there is provided a seal member fixed to said outer ring, and a seal lip formed at a radially-inward distal end of said seal member is constructed to be disposed in sliding contact with an outer peripheral surface of said inner ring; and wherein an annular mating member integral with said inner ring is provided at a bearing-outward side of said seal member, and an axial lip which extends toward the outside of the bearing and extends radially outwardly of said mating member is formed at a bearing-outward side face of said seal member, and said axial lip is disposed in non-contact, close relation to said mating member to form a labyrinth, and a radially outwardly-open groove is formed in a joint portion of said axial lip joined to said seal member.

2. A clutch release bearing as set forth in claim 1, wherein a groove is formed in the outside-diameter surface of said inner ring at a position disposed outwardly, with respect to the bearing, of the position where the seal lip of said seal member is disposed in sliding contact with the outside-diameter surface of said inner ring.

3. A clutch release bearing as set forth in claim 1, wherein a concave portion or a convex portion is formed at the bearing-outward side face of said seal member at a position disposed radially inwardly of said axial lip on the bearing-outward side face of said seal member.

4. A clutch release bearing as set forth in claim 1, wherein said mating member and said seal member are disposed in non-contact, close relation to each other to form a labyrinth.

5. A clutch release bearing as set forth in claim 1, wherein said mating member is a guide for smoothly effecting alignment of the clutch release bearing, and a slinger fixed to said inner ring and extending radially outwardly is provided between said seal member and said guide, and said seal member and said slinger are disposed in non-contact, close relation to each other in the axial direction to form a labyrinth, and said slinger and said guide are disposed in spaced-apart relation to each other in the axial direction such that a labyrinth is not formed.

6. A clutch release bearing as set forth in claim 1, wherein said mating member is an inner ring rib formed on and extending radially outwardly from said inner ring, and a projecting portion increasing in diameter toward the inside of the bearing is formed at said inner ring rib, and a distal end of said projecting portion is disposed in non-contact, close relation to the bearing-outward side face of said seal member.

7. A clutch release bearing comprising:

an outer ring, an inner ring, and a plurality of rolling elements rollably disposed between the outer ring and the inner ring;

wherein a radially inwardly-extending outer ring rib is formed at one side end portion of said outer ring, and also a bearing-outward side face of said outer ring rib is formed as a contact surface which a diaphragm spring is adapted to contact, and at one side end portion of said inner ring which is disposed at the same side as the one side where said outer ring rib is formed, a radially inwardly-extending inner ring rib is formed such that it is spaced a predetermined distance from said outer ring rib; and wherein a seal member is provided to extend over the one side end portion of said inner ring and the inner ring rib, and an axial lip disposed in non-contact, close relation to a distal end of said outer ring rib, as well as a seal lip disposed in non-contact, close relation to a bearing-inward side face of said outer ring rib, is formed at said seal member.

8. A clutch release bearing as set forth in claim 7, wherein a bearing-outward side of the distal end of said outer ring rib is chamfered to be inclining from the radially inward side toward the radially outward side from the inside of the bearing toward the outside of the bearing.

9. A clutch release bearing as set forth in claim 7, wherein the range of a portion of the distal end of said outer ring rib disposed in non-contact, close relation to the axial lip of said seal member is formed into a small width in the axial direction.

\* \* \* \* \*